United States Patent [19]
Matoba et al.

[11] Patent Number: 5,459,705
[45] Date of Patent: Oct. 17, 1995

[54] OPTICAL RECORDING MEDIUM DRIVING APPARATUS CAPABLE OF ACCURATELY DETECTING POSITION OF OPTICAL HEAD

[75] Inventors: Hirotsugu Matoba, Sakurai; Hiroshi Fuji; Kunio Kojima, both of Nara, all of Japan

[73] Assignee: Sharp Kabushiki Kaisha, Osaka, Japan

[21] Appl. No.: 910,838

[22] Filed: Jul. 8, 1992

[30] Foreign Application Priority Data

Jul. 8, 1991 [JP] Japan ..................... 3-167195

[51] Int. Cl.⁶ ........................................... G11B 7/08
[52] U.S. Cl. ..................... 369/44.34; 369/44.25; 369/44.32; 369/44.28; 369/124
[58] Field of Search ............... 369/44.34, 44.28, 369/44.32, 44.41, 124, 58, 44.26, 44.25, 44.11; 360/78.04, 75; 333/167, 172; 455/296, 307; 330/107, 109

[56] References Cited

U.S. PATENT DOCUMENTS

| | | | |
|---|---|---|---|
| 4,930,114 | 5/1990 | Tateishi | 369/124 |
| 4,959,823 | 9/1990 | Getreuer et al. | 369/124 |
| 4,961,182 | 10/1990 | Saito et al. | 369/124 |
| 5,128,917 | 7/1992 | Kiyoshi | 369/44.32 |
| 5,194,998 | 3/1993 | Kawasaki | 360/33.1 |

FOREIGN PATENT DOCUMENTS

| | | |
|---|---|---|
| 0277793 | 8/1988 | European Pat. Off. . |
| 0330414 | 8/1989 | European Pat. Off. . |
| 64-60823 | 3/1989 | Japan . |
| 2183422 | 7/1990 | Japan . |

*Primary Examiner*—Georgia Y. Epps
*Assistant Examiner*—Muhamad N. Edun
*Attorney, Agent, or Firm*—David G. Conlin; Kevin J. Fournier

[57] ABSTRACT

In an optical recording medium driving apparatus, only a frequency component corresponding to pits of an ID portion is detected from a total signal representing a total amount of reflected light from an optical disc by a high pass filter. With this frequency component clamped so that a potential at a maximum point becomes a definite potential, a changed amount of light of the total signal corresponding to pits is detected and a phase pit signal is generated. In response to this phase pit signal, a signal component corresponding to pits is removed from the total signal, thereby generating a pit removal signal.

6 Claims, 8 Drawing Sheets

OPTICAL RECORDING MEDIUM DRIVING APPARATUS CAPABLE OF ACCURATELY DETECTING POSITION OF OPTICAL HEAD

BACKGROUND OF THE INVENTION

1. Field of the Invention

The present invention relates to optical recording medium driving apparatuses and, more particularly, to an optical recording medium driving apparatus capable of accurately detecting the amount of radial movement of an optical head.

2. Description of the Related Art

Various track access methods have been proposed in an optical disc driving apparatus. One of such methods is a track count method. In this method, the number of pulses of a track crossing signal detected by an optical head is counted, the present position of the optical head is detected in accordance with the number of crossed tracks, and the optical head is moved to a target track by a linear motor or the like.

Figure 8A:
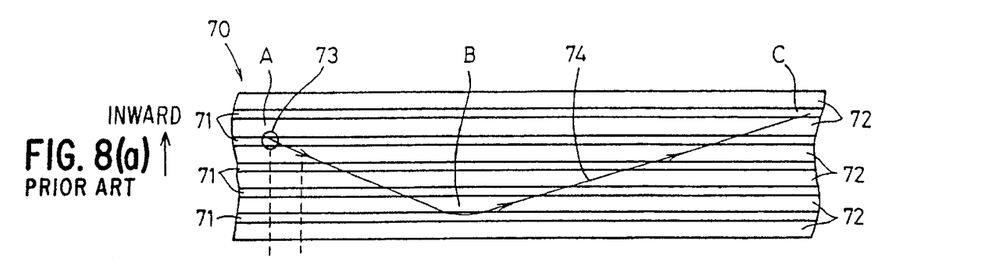
FIG. 8 is a time chart showing an operation of each portion of a conventional optical disc medium driving apparatus.

A conventional track count method will now be described. As shown in FIG. 8(a), guide grooves 71, 71 are provided with predetermined spacings on a surface of an optical disc 70, and tracks 72 are formed between adjacent guide grooves 71, 71.

In track access, a light beam 73 radially moves while crossing the tracks 72, 72 along, for example, an indicated arrow 74. The light beam 73 moves outward in the optical disc 70 between A and B in the figure, while the light beam 73 moves inward between B and C. The light beam 73 actually moves orthogonally or approximately orthogonally to the tracks 72, 72 in track access; however, since the optical disc 70 normally rotates also in track access, the trace of the light beam 73 on the optical disc 70 obliquely crosses the tracks 72, 72.

Figure 8B:
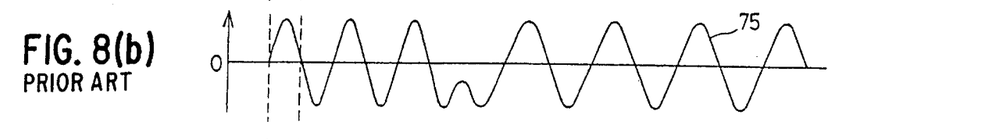
Figure 8C:
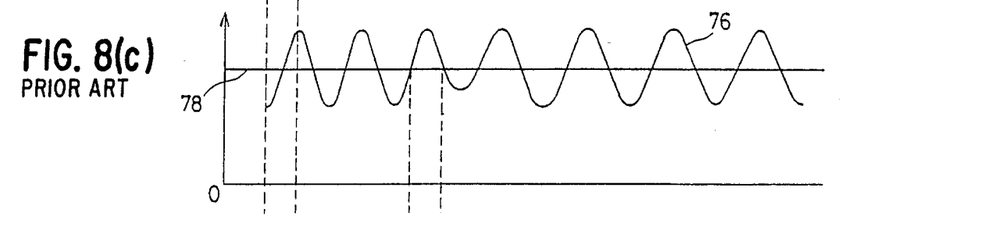

FIG. 8(b) shows the transition of a track error signal 75 when the light beam 73 moves along the indicated arrow 74. FIG. 8(c) shows the transition of a total signal 76 when the light beam 73 moves along the indicated arrow 74. The track error signal 75 is at a zero level in a central portion of the tracks 72 in its width direction, while the total signal 76 is at a maximum level in the central portion of the tracks 72 in its width direction.

The track error signal 75 is a difference signal of output signals of respective light receiving portions in, for example, a bipartite light detector (not shown), while the total signal 76 is a sum signal of the output signals of the respective light receiving portions in the bipartite light detector.

Figure 8D:
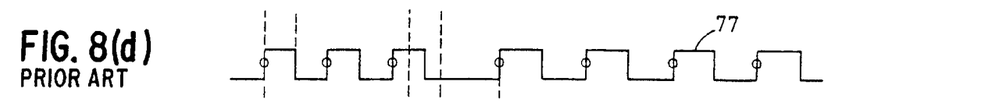
Figure 8E:
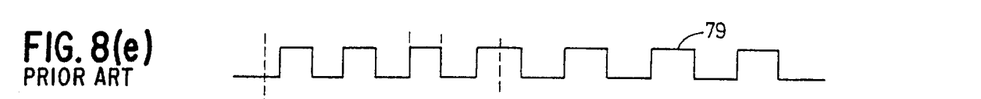

FIG. 8(d) shows a binarized track error signal 77 generated by binarization of the track error signal 75. FIG. 8(e) shows a land/groove determining signal 79 which is obtained by comparing the total signal 76 with a predetermined slice level 78 (FIG. 8(c)) by a comparator not shown and binarizing the compared signal. A low level of this land/groove determining signal 79 corresponds to the guide groove 71 (groove), while a high level thereof corresponds to the track 72 (land).

Figure 8F:
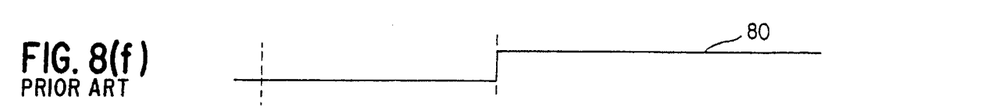

FIG. 8(f) shows a direction signal 80 obtained by latching the level of the land/groove determining signal 79 at the time of rising of the binarized track error signal 77. The direction signal 80 attains a low level when the light beam 73 is moving outward in the optical disc 70, while the direction signal 80 attains a high level when the light beam 73 is moving inward.

Figure 8G:
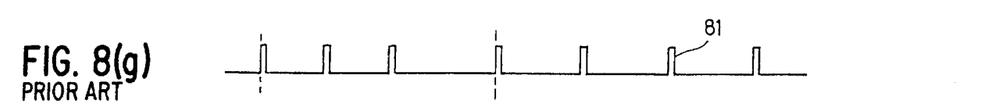

An edge detection signal 81 shown in FIG. 8(g) is pulses output for a predetermined time period after the rising time of the binarized track error signal 77. The edge detection signal 81 corresponds to timing at which the light beam 73 crosses the guide grooves 71 when the light beam is moving outward in the optical disc 70, while the signal 81 corresponds to timing at which the light beam 73 crosses the tracks 72 when the light beam is moving inward in the optical disc 70.

Figure 8H:
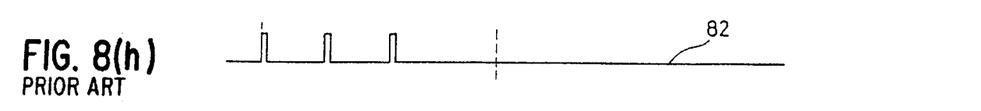
Figure 8I:
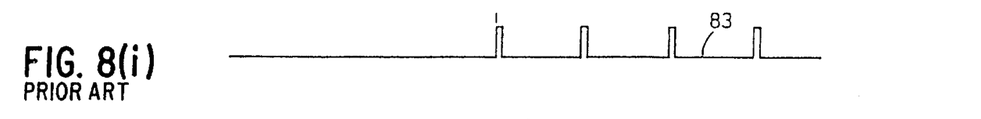

An up signal 82 of FIG. 8(h) and a down signal 83 of FIG. 8(i) are selected from the edge detection signal 81 in accordance with a logic level of the direction signal 80 (the up signal 82 is generated from the edge detection signal 81 when the direction signal 80 is at a low level, while the down signal 83 is generated when the direction signal 80 is at a high level.) The number of pulses of the up signal 82 corresponds to the number which the light beam 73 crosses the tracks 72 outward in the optical disc 70, while the number of pulses of the down signal 83 corresponds to the number which the light beam 73 crosses the tracks 72 inward in the optical disc 70.

Thus, if the up signal 82 and the down signal 83 are counted by an up-down counter not shown, it is then possible to detect the amount of radial movement of the optical head of the optical disc 70.

There is a case, however, where the amount of radial movement of the optical head cannot accurately be detected in the conventional optical disc driving apparatus. Such a case will now be described.

FIG. 9 shows the transition of various types of signals in FIG. 8 when the light beam 73 crosses an ID portion 84 which is recorded in advance by phase pits in advance and represents a track number and a sector number (various pits are not shown and the overall area is shown by hatching for facilitating the description).

Figures 9A, 9B:
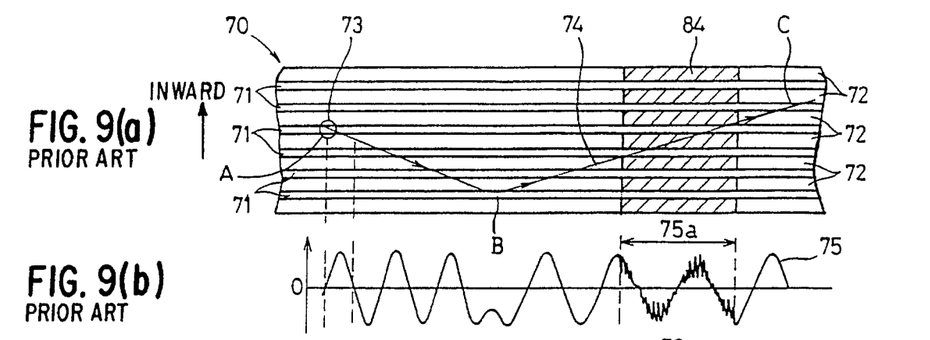
FIG. 9 is a time chart showing an operation of each portion of a conventional optical disc driving apparatus when a light beam passes an ID portion.
Figure 9C:
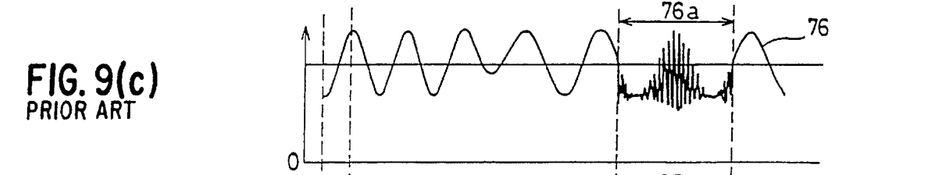

In the optical disc 70, when the light beam 73 passes the ID portion 84 previously recorded with phase pits as indicated by the arrow 74, as shown in FIG. 9(a), the track error signal 75 and the total signal 76 are subjected to modulation by phase pits and their waveforms are made irregular in periods 75a and 76a that the light beam 73 passes the ID portion 84, as shown in FIG. 9(b) and (c), respectively. Thus, when the light beam 73 crosses the ID portion 84, the track error signal 75 and the total signal 76 no longer correspond to timing at which the light beam 73 crosses the tracks. In order to eliminate this influence by phase pits, the track error signal 75 and the total signal 76 have their high pass band components, corresponding to phase pits, removed by a low pass filter not shown.

Figure 9D:
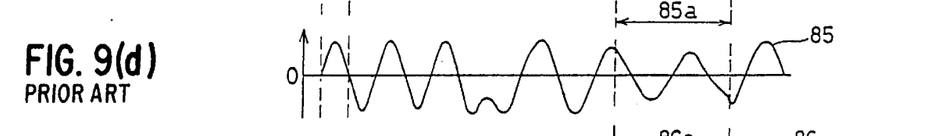
Figure 9E:
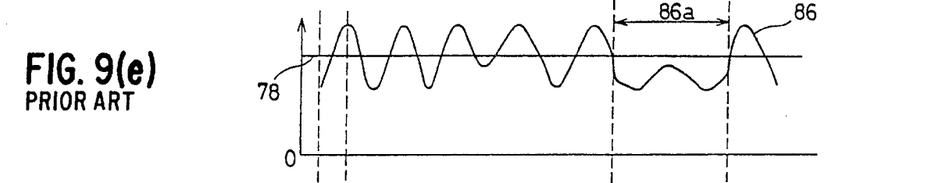

FIG. 9(d) and (e) shows a track error signal 85 and a total signal 86 that have passed the low pass filter, respectively. When the light beam 73 passes the ID portion 84, the track error signal 85 and the total signal 86 are of such waveforms as shown in periods 85a and 86a, respectively, and their high frequency components by phase pits are removed.

Figure 9F:
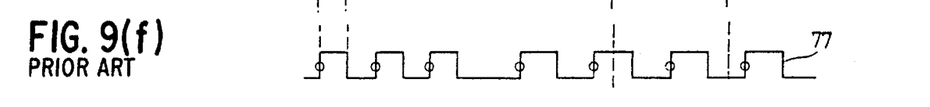

In this case, an amplitude merely becomes smaller in the period 85a, and a binarized track error signal 77 (FIG. 9(f)) obtained by being compared with a zero level corresponds to timing at which the light beam 73 crosses the tracks. However, the level of the signal becomes lower than a predetermined slice level 78 in the period 86a. Then, with respect to the land/groove determining signal 79 obtained by comparing the total signal 86 with the slice level 78 by a comparator not shown, a portion which attains a high level as shown by dotted lines in a case where there is no ID portion 84 attains a low level, as shown by solid lines in a period 79a corresponding to the ID portion 84 shown in FIG. 9(g), also during a period that the light beam passes a radial position corresponding to tracks 72.

Figures 9G, 9H, 9I:
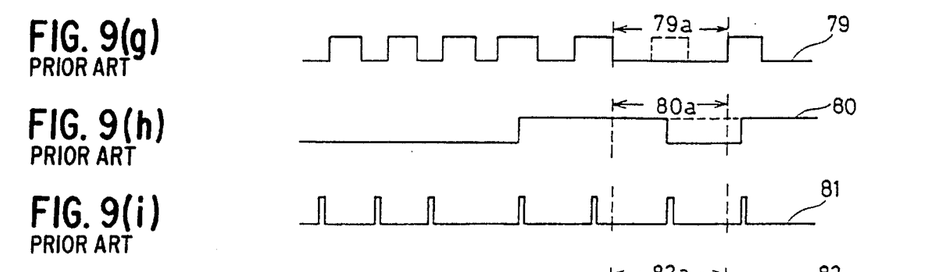

Thus, the level of the direction signal 80 of FIG. 9(h) changes accurately between a low level and a high level in a period 80a in accordance with the direction of movement of the light beam 73 as shown by dotted lines when there is no ID portion 84. When there is the ID portion 84, however, the direction signal 80 remains at a low level during a period that the light beam 73 moves inward as shown by solid lines in the period 80a.

Figure 9J:
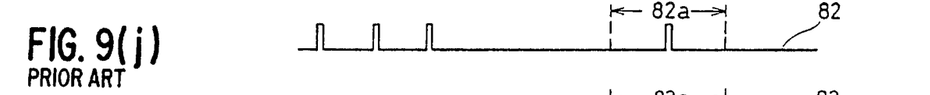
Figure 9K:
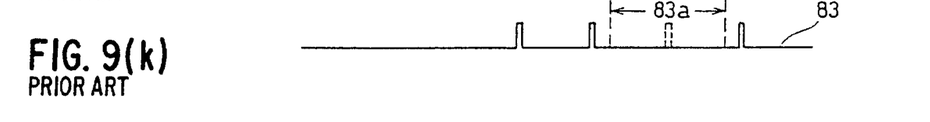

Therefore, no down signal is generated in a period 83a (FIG. 9(k)) in which the down signal 83 is inherently to be generated, and the up signal 82 is erroneously generated in a period 82a of FIG. 9(j). As a result, there occurs a count error in an up-down counter and hence, an accurate detection of the position of the optical head is not available.

SUMMARY OF THE INVENTION

One object of the present invention is therefore to carry out an accurate detection of the position of an optical head in an optical recording medium driving apparatus.

Another object of the present invention is to accurately detect the amount of radial movement of an optical head in an optical recording medium driving apparatus.

A further object of the present invention is to appropriately correct a total signal when a track crossing rate becomes high in an optical recording medium driving apparatus.

The above objects of the present invention are accomplished by an optical recording medium driving apparatus including the following elements. That is, an optical recording medium driving apparatus in accordance with the present invention reads a reproduction signal on an optical recording medium by moving an optical head in a radial direction of a rotating optical recording medium while directing a light beam onto the rotating optical recording medium. Concentric lands/grooves are alternately provided radially on the optical recording medium, and a portion formed of a plurality of pits is provided in a part of the optical recording medium. With the optical head moving over the portion formed of the plurality of pits, a reproduction signal includes a high frequency component. The optical recording medium driving apparatus includes a separator for separating a high frequency signal component from a reproduction signal, and a removing unit for removing a high frequency signal separated from the reproduction signal.

When the optical head scans over pits, these pits render a reproduction signal irregular, and a signal having a frequency component corresponding to the pits is included in the reproduction signal. Only a signal of the frequency component corresponding to these pits is separated by the separator. The high frequency component separated from the reproduction signal is removed by the removing unit. This prevents a reproduction signal from being affected by the pits.

For example, when the optical head scans at a relatively lower moving rate, the reproduction signal includes a signal of a frequency component corresponding to pits. The signal of this frequency component has a far higher frequency than that of a reproduction signal which is obtained when the optical head crosses the tracks crosses while scanning over portions other than a pit portion at the same moving rate. Accordingly, the use of this feature enables distinguishment between pits and non-pits (a portion other than pits).

The above-described high frequency component signal is separated from the reproduction signal by the separator. The separated high frequency component signal is clamped to a predetermined upper limit value and is output as a pit signal. With this clamping to a predetermined level, a direct current component is included in the pit signal, thereby enabling detection of a change in the amount of reflected light from the pit portion. Then, a pit signal corresponding to the change in the amount of the reflected light from the pits is removed from the reproduction signal by a pit signal removing unit. This enables accurate detection of a moving direction and a moving distance of the optical head, thereby enabling highly precise track access.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will now be described with reference to the drawings.

Figure 1A:
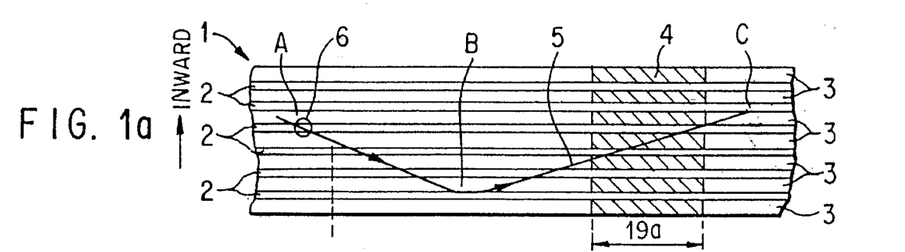
FIG. 1 is a time chart showing an operation of each portion of an optical recording medium driving apparatus of the present invention.

With reference to FIG. 1(a), concentric or helical guide grooves 2, 2 . . . (grooves) are provided with a definite spacing in an optical disc 1 (optical recording medium), and tracks 3 (lands) are formed between the guide grooves 2, 2.

The tracks 3 are each provided with an ID (identification) portion 4 which is previously recorded by phase pits (pits) and indicating a track number, a sector number and the like (i.e., a portion in which information is recorded in advance by pits). With reference to FIG. 1(a), individual pits are not shown, and the overall ID portion 4 is shown by hatched areas for facilitating the description. The depth of the pits is set to, for example, $\lambda/4$, and the depth of guide grooves 2, 2 is set to, for example, $\lambda/8$ ($\lambda$ is a wavelength of a light beam 6 which will be described later).

An indicated arrow 5 denotes one example of traces of the light beam 6 on the optical disc 1 in track access. The light beam 6 moves outward in the optical disc 1 between A and B, while the light beam 6 moves inward in the optical disc 1 between B and C.

Figure 2:
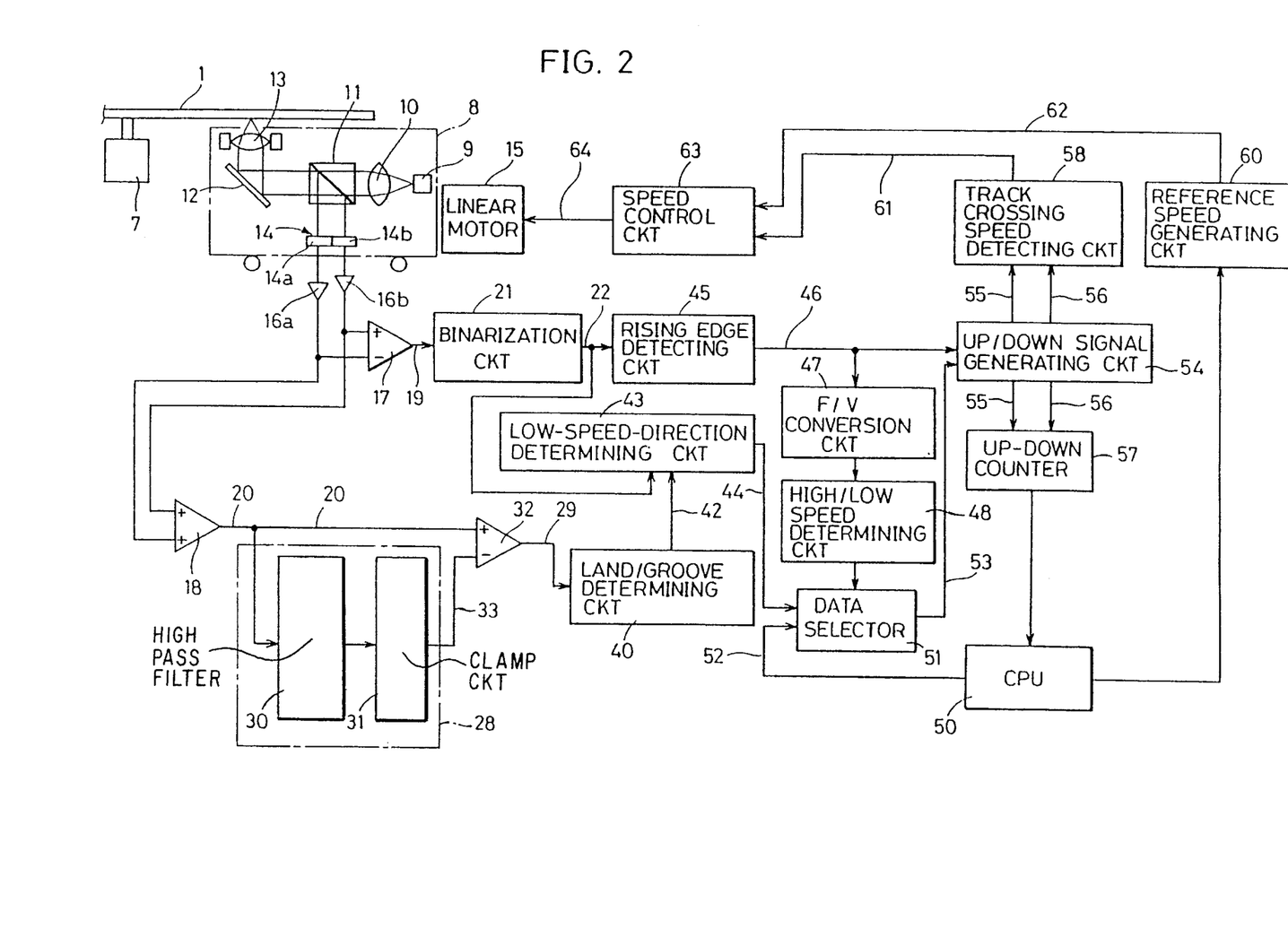
FIG. 2 is a diagram showing an overall structure of the optical recording medium driving apparatus.

As shown in FIG. 2, this optical disc driving apparatus (optical recording medium driving apparatus) supports the optical disc 1 by a spindle motor 7, and, for example, makes recording/reproduction or erasing of information by an optical head 8 while rotationally driving the optical disc at a constant rotation speed.

In the optical head 8, a laser beam emitted from a semiconductor laser 9 is made parallel rays by a collimation lens 10, then passes a beam splitter 11 and is reflected at approximately right angles by a reflecting mirror 12. The reflected rays are converged on the optical disc 1 by a converging lens 13.

The reflected light from the optical disc 1 reaches the beam splitter 11 via the converging lens 13 and the reflecting mirror 12, it is then reflected at approximately right angles by the beam splitter 11 and is incident on, for example, a bipartite light detector 14. The optical head 8 is moved radially on the optical disc 1 by an optical head moving unit such as a linear motor 15.

Figure 1B:
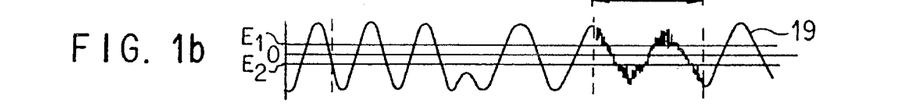

Current output signals from respective light receiving portions 14a and 14b of the bipartite light detector 14 are converted into voltage output signals by respective preamplifiers 16a and 16b and then introduced into a subtractor 17 and an adder 18, respectively. A track error signal 19 (FIG. 1(b)) as a reproduction signal is generated by the subtractor 17. A total signal 20 (FIG. 1(f)) is generated by the adder 18. The total signal 20 is input to a pit signal generating circuit 28 which will be described later and a subtractor 32 as pit signal removing means.

Figures 1C, 1D, 1E:
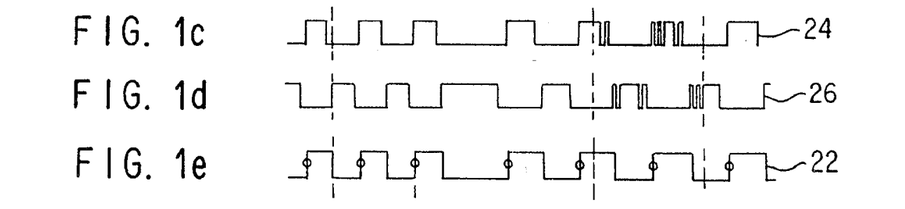
Figure 1F:
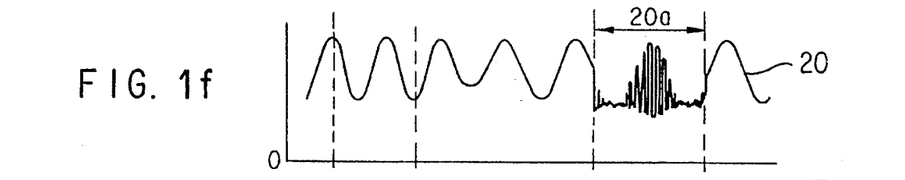

As shown in FIG. 2, the track error signal 19 is input to a binarization circuit 21, so that a binarized track error signal 22 is output (FIG. 1(e)).

A processing of the track error signal will now be described. The track error signal requires some correction since this signal is also naturally affected by pits. Actually, however, the track error signal in the pit portion has a shape shown in FIG. 3(A).

Figure 3:
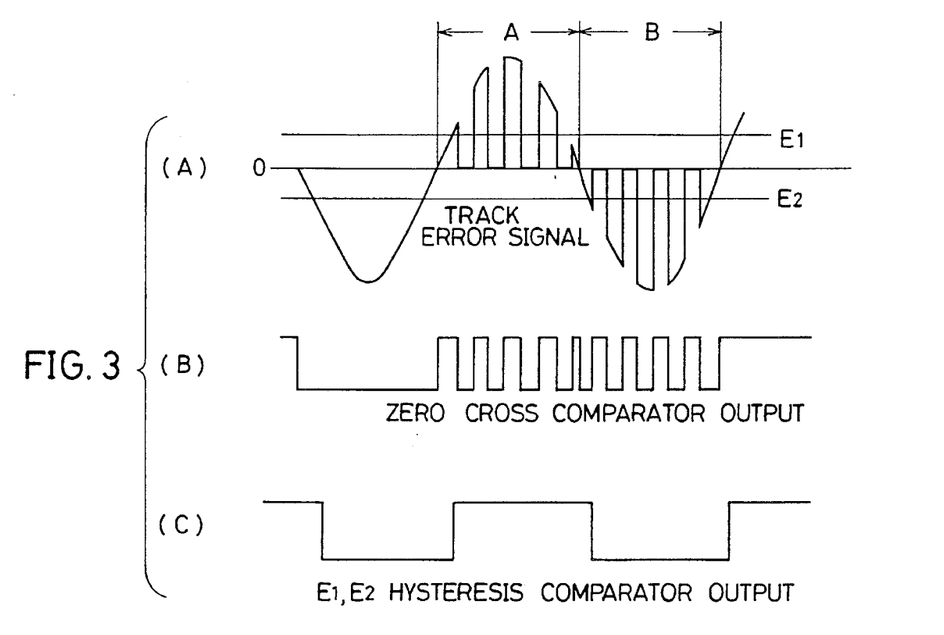
FIG. 3 is a diagram showing a waveform of a tracking error signal and outputs of comparators.

That is, even if the track error signal falls down to 0V by influences of pits, the signal normally has no reverse polarity (for example, a minus side in a part A and a plus side in a part B). However, if the track error signal is binarized simply by a zero cross comparator as shown in FIG. 3(B), so as to detect whether the optical head crosses the tracks, it is possible that an erroneous signal is output in the pit portion. It is thus necessary to employ a comparator having hysteresis levels E1 and E2. In this invention, this is realized by employing a binarization circuit 21 shown in FIG. 4. As a result, a binarized signal of clear track crossing shown in FIG. 1(e) can be obtained from the track error signal affected by the pits shown in FIG. 1(b).

Figure 4:
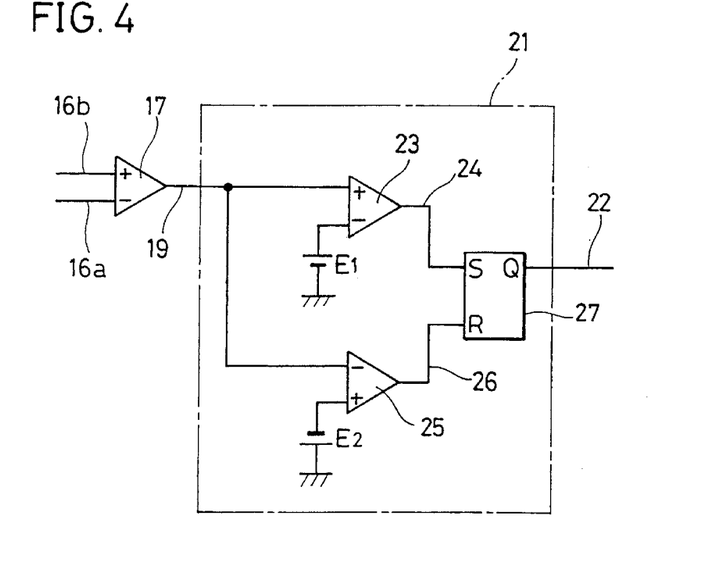
FIG. 4 is a circuit diagram of a binarization circuit in the optical recording medium driving apparatus.

FIG. 4 shows a specific example of the binarization circuit 21. The binarization circuit 21 includes comparators 23 and 25 and an RS flipflop 27. The track error signal 19 is compared with a predetermined level E1 having a positive value by the comparator 23, so that a binarized signal 24 (FIG. 1(c)) is output. The track error signal 19 is also compared with a predetermined level E2 having a negative value by the comparator 25, so that a binarized signal 26 (FIG. 1(d)) is output. The above-described binarized signal 24 is input to a set input terminal S of the RS flipflop 27, and the binarized signal 26 is input to a reset input terminal R. Accordingly, a binarized track error signal 22 which is not affected by modulation is output form the RS flipflop 27 (see 19a of FIG. 1(b)). The binarized track error signal 22 is input to a direction determining circuit 43 at low speed and a rising edge detecting circuit 45 which will be described later.

Figure 1G:
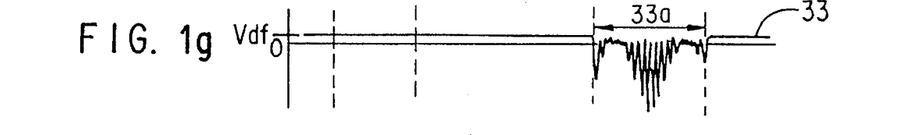
Figure 1H:
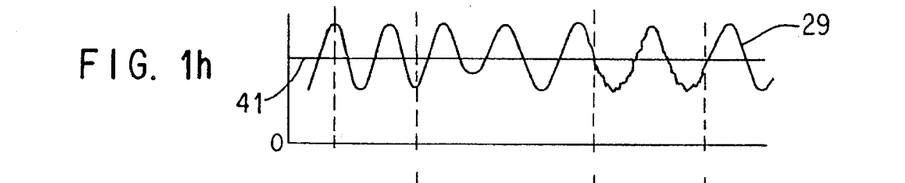
Figure 1I:
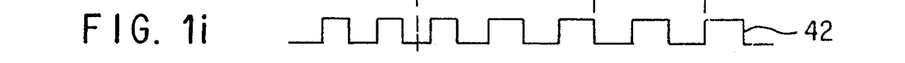

With reference to FIG. 2, a total signal 20 is input to a pit signal generating circuit 28 and a subtractor 32, and a phase pit signal 33 is subtracted from the total signal 20 and then output as a pit removal signal 29 (FIG. 1(h)).

Figure 5:
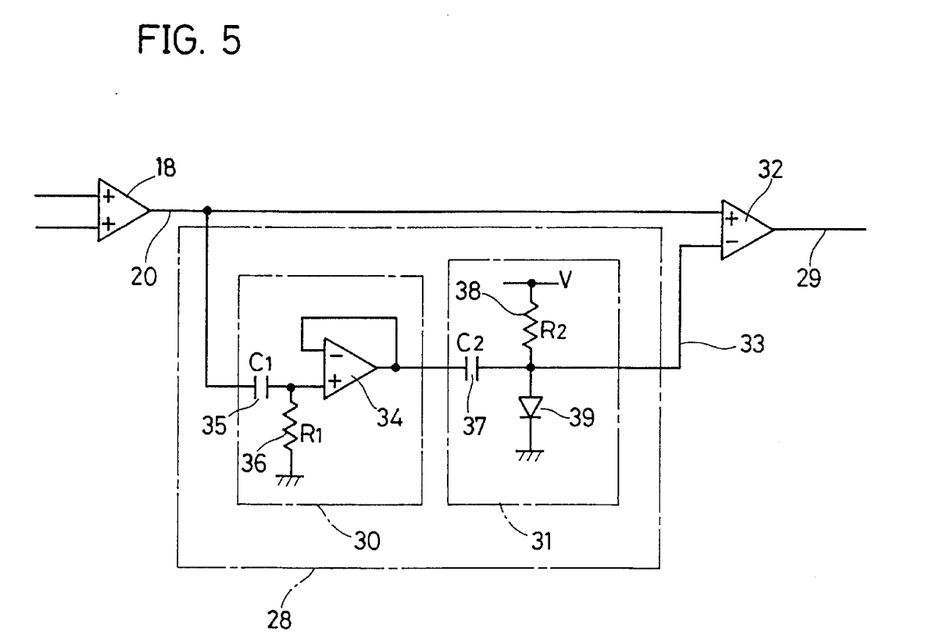
FIG. 5 is a circuit diagram of a pit signal removing circuit in the optical recording medium driving apparatus.

FIG. 5 shows a specific example of the pit signal generating circuit 28. The pit signal generating circuit 28 includes a high pass filter 30 and a clamp circuit 31.

The high pass filter 30 includes an operational amplifier 34, a capacitor 35 (a capacitance C1) connected to a plus input terminal of the operational amplifier 34, and a resistor 36 (a resistance value R1) connected between the plus input terminal and ground. A cut-off frequency of the high pass filter 30 is $f1=1/(2\pi \cdot C1 \cdot R1)$(Hz), and an input signal (the total signal 20 in this case) is allowed to pass only frequency components not lower than approximately f1.

When a moving speed of the optical head 8 is relatively low, a frequency component of the total signal 20 which corresponds to a change in the amount of light when a light beam crosses phase pits is substantially higher than that corresponding to a change in the amount of light when the light beam crosses tracks. Therefore, selecting the capacitance C1 and the resistance value R1 makes it possible to extract the frequency component corresponding to the phase pits from the input signal of the high pass filter 30. This frequency component includes no direct current component. Thus, the clamp circuit 31 adds a direct current component to the above frequency component.

The clamp circuit 31 includes a capacitor 37 (a capacitance C2) connected between an output and an input of the clamp circuit 31, a resistor 38 (a resistance value R2) connected between the output and a positive voltage V, and a diode 39 connected between the output and ground.

The clamp circuit 31 is provided so that its output signal does not rise to a predetermined potential (e.g., a ground potential) or a higher potential when the input signal of the clamp circuit 31 increases. That is, in such a state that the input signal rises to not lower than the ground potential (precisely a forward voltage drop Vdf of the diode 39), a forward current flows through the diode 39, so that an upper end of the output signal does not rise higher than the ground potential. When the input signal decreases, the amount of decrease of the input signal passes the capacitor 37, so that the output signal becomes a signal which is lower than the ground potential by the change of the input signal, as shown in the period 33a of FIG. 1(g). Accordingly, a phase pit signal 33 being an output of the clamp circuit 31 becomes a signal representing the changed amount of light corresponding to the phase pits as shown in FIG. 1(g).

With the above phase pit signal 33 subtracted from the total signal 20 by the subtractor 32, the changed amount of light corresponding to the phase pits in the total signal 20 can be removed, and a pit removal signal 29 which is not affected by the phase pits is obtained. This corresponds to timing at which the light beam 6 crosses the tracks 3.

Although the high pass filter 30 is used in the pit signal generating circuit 28, if a time constant $C2 \cdot R2$ of the capacitor 37 and the resistor 38 in the clamp circuit 31 is set to be equal to a time constant $C1 \cdot R1$ of the high pass filter 30, the pit signal generating circuit 28 carries out almost the same operation as above even without the high pass filter 30.

Referring to FIG. 2, the pit removal signal 29 obtained by the pit signal generating circuit 28 and the subtractor 32 is input to a land/groove determining circuit 40, then compared with a predetermined slice level 41 (FIG. 1(*h*)) by a comparator not shown and output as a land/groove determining signal 42 (FIG. 1(*i*)). A low level of the land/groove determining signal 42 corresponds to the guide grooves 2 (grooves), while a high level thereof corresponds to the tracks 3 (lands).

Figure 1J:
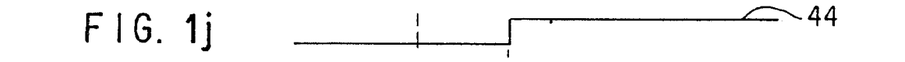

The land/groove determining signal 42 and the binarized track error signal 22 are input to the direction determining circuit 43 at low speed. In the circuit 43, the land/groove determining signal 42 is latched at a rising time shown by a circle of FIG. 1(*e*) of the binarized track error signal 22, whereby a direction signal 44 at low speed (FIG. 1(*j*)) corresponding to the direction of movement of the light beam 6 is obtained. A low level of the direction signal 44 represents that the moving direction of the light beam 6 is from an inner circumference to an outer circumference of the optical disc 1, while its high level represents that the moving direction of the light beam 6 is from the outer circumference to the inner circumference. The direction signal 44 at low speed is input to a data selector 51.

The binarized track error signal 22 is input to the rising edge detecting circuit 45, so that an edge detection signal 46 (FIG. 1(*k*)) which is to be output for a predetermined period after a rising of the binarized track error signal 22 is output. This edge detection signal 46 corresponds to timing at which the light beam 6 crosses over the guide grooves 2 while moving outward in the optical disc 1, and the edge detection signal 46 corresponds to timing at which the light beam 6 crosses over the tracks 3 while moving inward in the optical disc 1. The edge detection signal 46 is input to an F/V conversion circuit 47 and an up/down signal generating circuit 54.

The edge detection signal 46 input to the F/V conversion circuit 47 is F/V (frequency/voltage)-converted. This results in an absolute value of the track crossing rate of the light beam 6, as an output of the F/V conversion circuit 47. The output of the F/V conversion circuit 47 is input to a high/low speed determining circuit 48 and compared with a predetermined level. In accordance with a result of the comparison, a signal which determines whether the track crossing rate of the light beam 6 is not lower than a predetermined high speed or lower than a predetermined speed is output from a high/low speed determining circuit 48 and then input into the data selector 51.

In the optical disc apparatus according to the present invention, a track crossing rate during a seek (access) operation is about 1 m/s at maximum. If a track pitch is 1.6 μm, then a frequency of a track error signal (and a total signal) is 625 kHz. Since a frequency of data recorded by pits is about 2–4 MHz, this frequency is only about 3–6 times a maximum frequency of the track error signal or the total signal.

As described above, since a frequency component of track crossing is close to a fraction of the frequency component of a pit component, it is considered that a sufficient correction of the total signal is not made at this time and an erroneous determination is made on the direction of relative movement of the optical head (the light beam) and the tracks. However, when the optical head is moving at such a high speed that a sufficient correction is not made, the direction in which a CPU drives the optical head is regarded as the direction in which the optical head moves with respect to the tracks. In this case, such an erroneous determination is not made.

In access, a CPU (central processing unit) 50 which receives an instruction of access is able to identify the direction of movement of the optical head 8 by comparing a target track and the present track. When the optical head 8 is moving at a low speed, however, the light beam 6 sometimes moves in an opposite direction to the direction identified by the CPU50 due to influences by an eccentricity component of the optical disc 1.

That is, when the tracks 3 (guide grooves 2) of the optical disc 1 are eccentric, even if the optical head 8 is stationary at a certain position, the light beam crosses over the same track 3 (guide groove 2) with rotation of the optical disc 1. In view of this point, when a speed at which the light beam 6 moves radially is relatively low and a radial position of the track 3 which is made eccentric with the rotation of the optical disc 1 shifts at a higher speed than the moving speed of the light beam 6 in the same direction as the moving direction of the light beam 6, a relative moving direction of the light beam 6 with respect to the track 3 is consequently opposite from the actual moving direction of the light beam 6 (i.e., the direction identified by the CPU50). That is, when the light beam 6 is moving at a low speed, the moving direction identified by the CPU50 is not necessarily identical to the moving direction of the light beam 6 viewed in a relative positional relationship with the track 3.

This will now be explained in the following.

Figure 6:
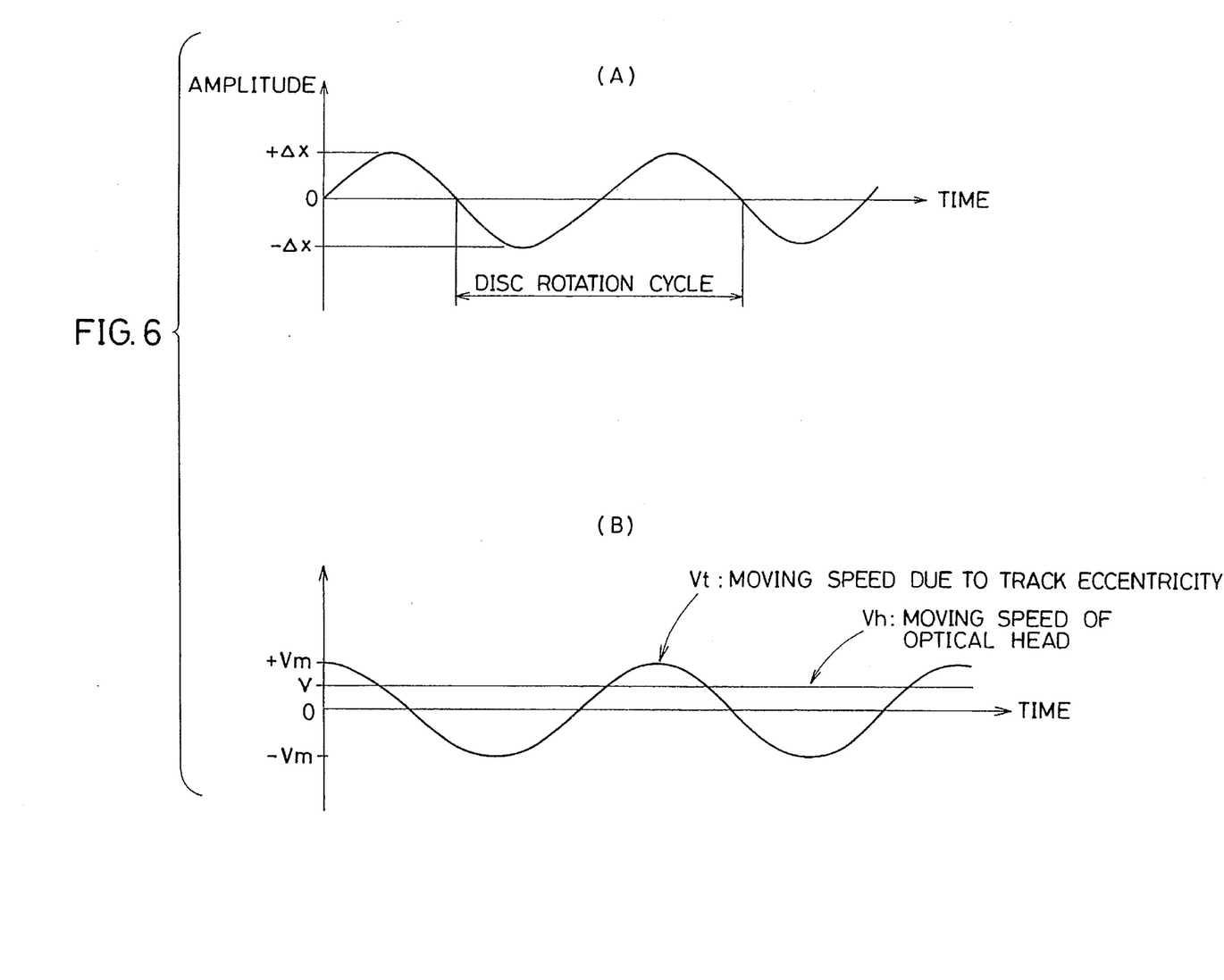
FIG. 6 is a diagram for use in explaining influences caused by eccentricity of an optical disc.

With reference to FIG. 6(A) and (B), when a rotation center O of the disc is shifted by $\Delta x$ from a center O' of tracks formed almost on circumferences of the disc, if the disc is observed from a point A which is a definite distance apart from the rotation center O of the disc, it appears that the track moves back and forth from the point A as a center with the rotation of the disc. Its amplitude is $\pm \Delta x$ and the cycle is a rotation cycle of the disc.

At this time, if a rotation frequency of the disc is fr, a speed Vm at which the track moves in the radial direction of the disc is: $V_m = 2\pi fr \cdot \Delta x$. That is, the track moves at a speed in the form of sine waves in which a maximum value $v_m = 2\pi fr \cdot \Delta x$ in the inner and outer circumferential directions of the disc by rotation of the disc. Such a case is now considered that the optical head is moved outward in the disc at a speed v. Since it appears that the track approaches closer and closer to the optical head at the time which the track moves inward in the disc by the rotation of the disc (the time which the moving speed of the track is minus in FIG. 6(B)), a relative moving direction of the optical head and the track is outward similarly to the moving direction of the optical head itself.

If the moving rate of the track changes to plus, since this means that the track is moving outward in the disc, the track follows behind the optical head. At the time which $v_t$ (moving speed due to track eccentricity) exceeds $v_h$ (moving speed of optical head), the track goes further before the optical head. As a result, despite the fact that the optical head is moving outward in the disc, the relative moving direction with respect to the track is reversed and the optical head matches a track on a further inner circumferential side of the disc.

Inherently, the purpose of the seek (access) operation is not "how many meter point in the radial direction of the disc the optical head moves to", but "which order of track the optical head moves to." When the optical head is left behind the track by eccentricity, a target track is far behind away. Conversely, when the track is coming closer, it is necessary to detect that the target track is close.

Consequently, the reversal of the relative moving speed and the direction are caused until the moving speed $v_h$ of the optical head (an absolute speed not a relative speed with respect to the track on the disc) becomes higher in absolute value than the speed $v_t$ (an absolute speed) due to eccentricity of the track.

When the light beam 6 is moving at a high speed, the moving speed of the light beam 6 is higher than the eccentricity speed of the track 3, and hence the movement direction identified by the CPU 50 matches the movement direction of the light beam 6 viewed in a relative positional relationship with the track 3.

Accordingly, if the direction detected by the low-speed-direction determining circuit 43 is adopted as the moving direction of the light beam when the light beam 6 moves at a low speed, and the direction identified by the CPU 50 in accordance with the target track and the present track is adopted when the light beam 6 moves at a high speed, an accurate moving direction of the light beam 6 in access can be detected.

Thus, three types of signals, a signal from the high/low speed determining circuit 48, a low-speed-direction signal 44 and an access direction signal 52 are input in the data selector 51. In response to an output of the high/low speed determining circuit 48, the low-speed-direction signal 44 from the low-speed-direction determining circuit 43 is selected at the time of low speed, while the access direction signal 52 identified by the CPU 50 is selected and output as a direction signal 53 at the time of high speed.

Figures 1K, 1L:
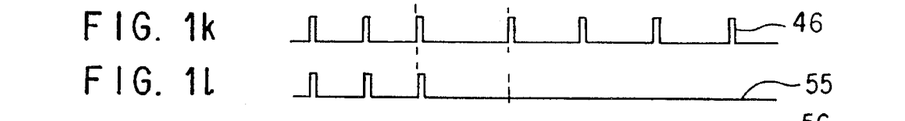
Figure 1M:
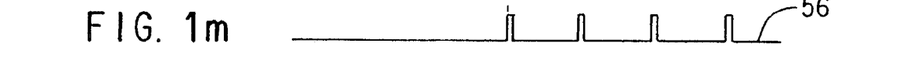

The edge detection signal 46 and the direction signal 53 are input into the up/down signal generating circuit 54. When the direction signal 53 is at a low level, an up signal 55 (FIG. 1(*l*)) is generated in response to the edge detection signal 46, while when the direction signal 53 is at a high level, a down signal 56 (FIG. 1(*m*)) is generated in response to the edge detection signal 46. It is now assumed that the direction signal 53 is identical to the low-speed-direction signal 44 of FIG. 1(*j*). The up signal 55 and the down signal 56 are input into the up-down counter 57 and the track crossing speed detecting circuit 58.

The up signal 55 corresponds to timing at which the light beam 6 crosses over the guide grooves 2 when moving outward in the optical disc 1, while the down signal 56 corresponds to timing at which the light beam 6 crosses over the tracks 3 when moving inward in the optical disc 1.

The up signal 55 and the down signal 56 are counted by the up-down counter 57, thereby enabling detection of the number of tracks 3 over which the light beam 6 crosses. This detection is made accurately for the foregoing reasons even in a case where the optical disc 1 has eccentricity.

The up signal 55 and the down signal 56 are input into the track crossing speed detection circuit 58, and F/V conversion means or the like detects the radial moving speed of the light beam 6 with respect to the optical disc 1 in access time (this moving speed is different from the one obtained by the F/V conversion circuit 47 and includes a moving direction).

At the time of access, the amount of movement of the optical head 8 is detected by the CPU 50 in response to an output of the up-down counter 57. In accordance with the detected movement amount, a reference speed signal 62 corresponding to a remaining distance to the target track is generated by a reference speed generating circuit 60.

A moving speed signal 61 output from the track crossing speed detecting circuit 58 and the reference speed signal 62 from the reference speed generating circuit 60 are input to a speed control circuit 63. Based on the difference between the moving speed signal 61 and the reference speed signal 62, a speed control signal 64 is output to a linear motor 15. Accordingly, the speed of the linear motor 15 is controlled so that the moving speed of the optical head 8 is equal to the above reference speed, and the optical head 8 is driven at an optimal speed corresponding to the remaining distance to the target track.

Figure 7A:
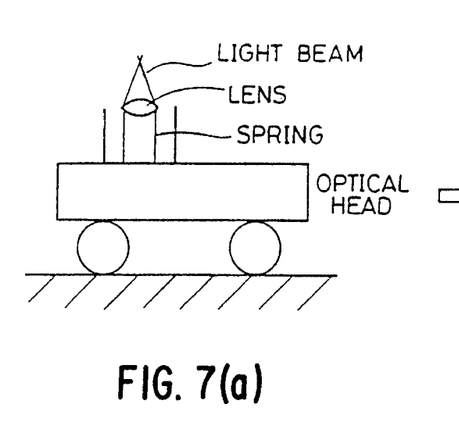
FIGS. 7(A) and 7(B) are diagrams for use in explaining a deviation in moving speed of a light beam.
Figure 7B:
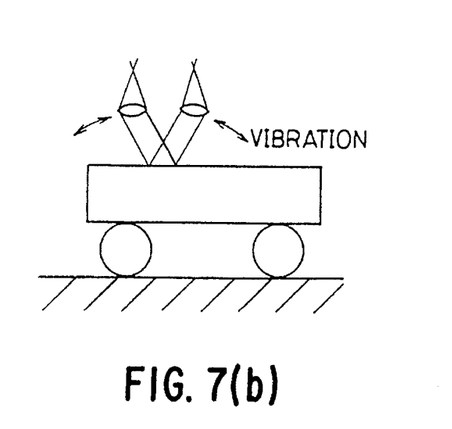

In this embodiment, it may be considered that the moving speed of the light beam 6 is identical to that of the optical head 8. Strictly, the both speeds do not match due to vibration of an actuator spring supporting a lens for focusing the light beam (see FIG. 7). While a method in which a lens is electrically locked so as not to move during a seek operation is widely adapted, the both speeds are set equal in order to facilitate understandings in the present application.

In addition, in the embodiment, a definition of "high speed" or "lower speed" is such that "low speed" is applied in a case where it is possible that the above-described track eccentricity speed $v_t$ is higher than the optical head moving speed $v_h$ and the reversal of the relative moving speed and the direction occurs.

That is, "low speed" is defined when there is a possibility of $(v_h-v_t)<0$ where $v_t$ is a track eccentricity speed and $v_h$ is an optical head speed.

The amount of eccentricity of the disc (a displacement in amplitude) is different for industrial use or household use and is several ten to several hundred μm. A rotation frequency of the disc is also in the range from approximately 10 Hz for use of CDs to approximately 60 Hz for use of computers.

Assume that the rotation frequency of the disc is 60 Hz and the eccentricity amount of the disc is 100 μm, a maximum value of the disc eccentricity speed is:

$$v_m=2\pi fr\cdot\Delta x=2\pi\times10\times(100\times10^{-6})/2=0.019 \text{ m/sec}$$

Accordingly, "low speed" is determined when the moving speed of the optical head is lower than $v_m$. In fact, such a double or triple value can be revised to $v_m$ as a determination reference which can cope with a disc having a slightly larger amount of eccentricity.

While the ID portion 4 is proposed as the pit portion for explanation in the foregoing embodiment, the present invention is effective not only to the ID portion in which information of a sector and a track is recorded by phase pits, but also to a track portion of an ROM disc or an overwrite optical disc of a pit formation type in which data information is recorded by phase pits.

As has been described heretofore, in the optical disc driving apparatus according to this embodiment, when the optical head 8 moves at a relatively low speed, it is possible to extract only a frequency component provided when the light beam crosses pits by using the high pass filter 30 by utilizing the feature that a frequency component of the total signal 20 which corresponds to a change in the amount of light upon crossing over pits is substantially higher than that which corresponds to a change in the amount of light upon crossing over the tracks 3. However, since the frequency component of the total signal 20 which is obtained by the high pass filter 30 and corresponds to the change in the amount of light upon crossing over pits does not include any direct current components, the signal is not allowed to be a signal including information as to a change in the amount of light by pits. Thus, if the clamp circuit 31 clamps a maximum point of the frequency component corresponding to the changed amount of light upon crossing over pits to a definite potential, then the phase pit signal 33 representing the change in the amount of light of the total signal 20 corresponding to pits can be generated. Then, by the subtractor 32 which subtracts the phase pit signal 33 being the signal component corresponding to pits from the total signal 20 and generates the pit removal signal 29, a total signal from which the change in the amount of light by pits is removed is obtained, thereby enabling an accurate detection of the moving direction of the optical head 8 and precisely leading the optical head 8 to a desired track 3.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical recording medium driving apparatus for reading a reproduction signal on a rotating optical recording medium by moving an optical head in a radial direction of said optical recording medium while directing a light beam onto said rotating optical recording medium, wherein concentric lands/grooves are alternately provided in said radial direction on said optical recording medium, a portion formed of a plurality of pits is present on a part of said recording medium, and said reproduction signal includes a signal having a frequency component corresponding to said pits, with said optical head scanning over the portion formed of said pits, said optical recording medium driving apparatus comprising:

means for separating a signal component corresponding to said pits from said reproduction signal; and first removal means for removing said separated signal from said reproduction signal;

wherein the frequency component corresponding to said pits includes a high frequency component; and said separating means includes a high pass filter and clamp means.

2. The optical recording medium driving apparatus according to claim 1, wherein said first removal means includes a subtractor.

3. The optical recording medium driving apparatus according to claim 1, wherein said driving apparatus includes track error signal detecting means for detecting a track error, and said driving apparatus further includes second removal means for removing an influence caused by said high frequency component of said track error signal.

4. The driving apparatus according to claim 3, wherein said second removal means includes binarization means for binarizing said track error signal by a plurality of threshold values.

5. The driving apparatus according to claim 4, wherein said binarization means includes first comparison means for determining whether said track error signal is higher than a predetermined first potential, second comparison means for determining whether said track error signal is lower than a predetermined second potential, and R-S flipflop means connected to said first and second comparison means.

6. An optical recording medium driving apparatus having an optical head for directing a light beam to an optical recording medium and receiving a reflected light from said optical recording medium so as to output a reproduction signal, wherein lands and groove alternately provided in a radial direction of said optical recording medium, and a portion in which information is recorded in advance by pits are present on said optical recording medium, said driving apparatus comprising:

means for separating a signal of a frequency component corresponding to said pits included in said reproduction signal;

means for clamping an amplitude of said frequency component signal to a predetermined level; and means for removing said separated signal clamped to said predetermined level from said reproduction signal.

\* \* \* \* \*